US008984150B2

(12) United States Patent
Albert et al.

(10) Patent No.: US 8,984,150 B2
(45) Date of Patent: Mar. 17, 2015

(54) ELECTRONIC SUPPLY CHAIN MANAGEMENT

(75) Inventors: Peter B. Albert, San Francisco, CA (US); Darin D. Fisher, Belmont, CA (US); Eric Y. Lin, Dublin, CA (US); Luis G. Marmolejo-Meillon, San Jose, CA (US)

(73) Assignee: iPass Inc., Redwood Shores, CA (US)

( * ) Notice: Subject to any disclaimer, the term of this patent is extended or adjusted under 35 U.S.C. 154(b) by 1394 days.

(21) Appl. No.: 12/174,371

(22) Filed: Jul. 16, 2008

(65) Prior Publication Data

US 2010/0017525 A1 Jan. 21, 2010

(51) Int. Cl.
 G06F 15/16 (2006.01)
 H04L 12/24 (2006.01)
 H04L 12/26 (2006.01)

(52) U.S. Cl.
 CPC ............ H04L 41/12 (2013.01); H04L 43/0811 (2013.01); *H04L 41/046* (2013.01); *H04L 41/22* (2013.01)
 USPC ....................................................... 709/229

(58) Field of Classification Search
 USPC ....................................................... 709/229
 See application file for complete search history.

(56) References Cited

U.S. PATENT DOCUMENTS

| | | | |
|---|---|---|---|
| 6,377,982 B1 * | 4/2002 | Rai et al. ........................ | 709/217 |
| 6,751,663 B1 * | 6/2004 | Farrell et al. ................... | 709/224 |
| 7,167,860 B1 * | 1/2007 | Black et al. ...................... | 707/10 |
| 7,243,143 B1 * | 7/2007 | Bullard ........................... | 709/223 |
| 2001/0044893 A1 * | 11/2001 | Skemer .......................... | 713/153 |
| 2002/0091636 A1 * | 7/2002 | Carroll Bullard ............... | 705/40 |
| 2004/0031059 A1 * | 2/2004 | Bialk et al. ..................... | 725/129 |
| 2005/0044419 A1 * | 2/2005 | Jones et al. ..................... | 713/201 |
| 2005/0083911 A1 * | 4/2005 | Grabelsky et al. ............. | 370/352 |
| 2006/0168170 A1 * | 7/2006 | Korzeniowski ................ | 709/223 |
| 2007/0118616 A1 * | 5/2007 | Simonini et al. .............. | 709/219 |
| 2007/0256122 A1 * | 11/2007 | Foo et al. .......................... | 726/5 |

* cited by examiner

*Primary Examiner* — Moustafa M Meky
*Assistant Examiner* — Blake Rubin
(74) *Attorney, Agent, or Firm* — DeLizio Gilliam, PLLC

(57) ABSTRACT

In some embodiments a method for correlating supply chain network information received from supply chain network components controlled by different entities includes receiving connection agent information indicating access point identifiers associated with network access points; receiving provisioning information including physical location identifiers identifying venues at which the network access points reside; receiving network authorization request and response records, wherein the network authorization request and response records include data associated with the connection agent information and the provisioning data. The method can also include determining an association between one of the physical location identifiers that identifies one of the venues and one of the access point identifiers associated with one of the network access points, the determining including, selecting, based on the common data, the physical location identifier from the provisioning information; and selecting, based on the common data, the one of the access point identifiers from the connection agent information.

26 Claims, 10 Drawing Sheets

ELECTRONIC SUPPLY CHAIN MANAGEMENT

TECHNICAL FIELD

Embodiments of the inventive subject matter generally relate to the field of computer networking, and more particularly to managing supply chain networks.

BACKGROUND

Computer-related services often involve supply chains. For example, consider internet websites that offer subscription-based services accessible over the Internet. Before a website's subscribers can utilize its services, they must successfully connect to the website using supply chains including telephone/cable companies, Internet Service Providers (ISPs), long-haul telecommunications lines, and other telecommunications infrastructure. Even when the website is functioning properly, other supply chain components can affect how subscribers perceive the website's performance. For example, if an ISP's equipment is causing performance lags or poor connectivity, website subscribers may mistakenly believe the website is performing poorly. If the ISP's poor performance persists, the website may lose subscribers through no fault of its own.

SUMMARY

In some embodiments a method for correlating supply chain network information received from supply chain network components controlled by different entities includes receiving connection agent information indicating access point identifiers associated with network access points; receiving provisioning information including physical location identifiers identifying venues at which the network access points reside; receiving network authorization request and response records, wherein the network authorization request and response records include data associated with the connection agent information and the provisioning data. The method can also include determining an association between one of the physical location identifiers that identifies one of the venues and one of the access point identifiers associated with one of the network access points, the determining including, selecting, based on the common data, the physical location identifier from the provisioning information; and selecting, based on the common data, the one of the access point identifiers from the connection agent information.

BRIEF DESCRIPTION OF THE DRAWINGS

The inventive subject matter is illustrated by way of example and not limitation in the Figures of the accompanying drawings in which.

DESCRIPTION OF EMBODIMENT(S)

The description that follows includes exemplary systems, methods, techniques, instruction sequences, and computer program products that embody techniques of the inventive subject matter. However, the described embodiments may be practiced without these specific details.

Introduction

This section provides an introduction to some embodiments of the inventive subject matter.

Figure 1:
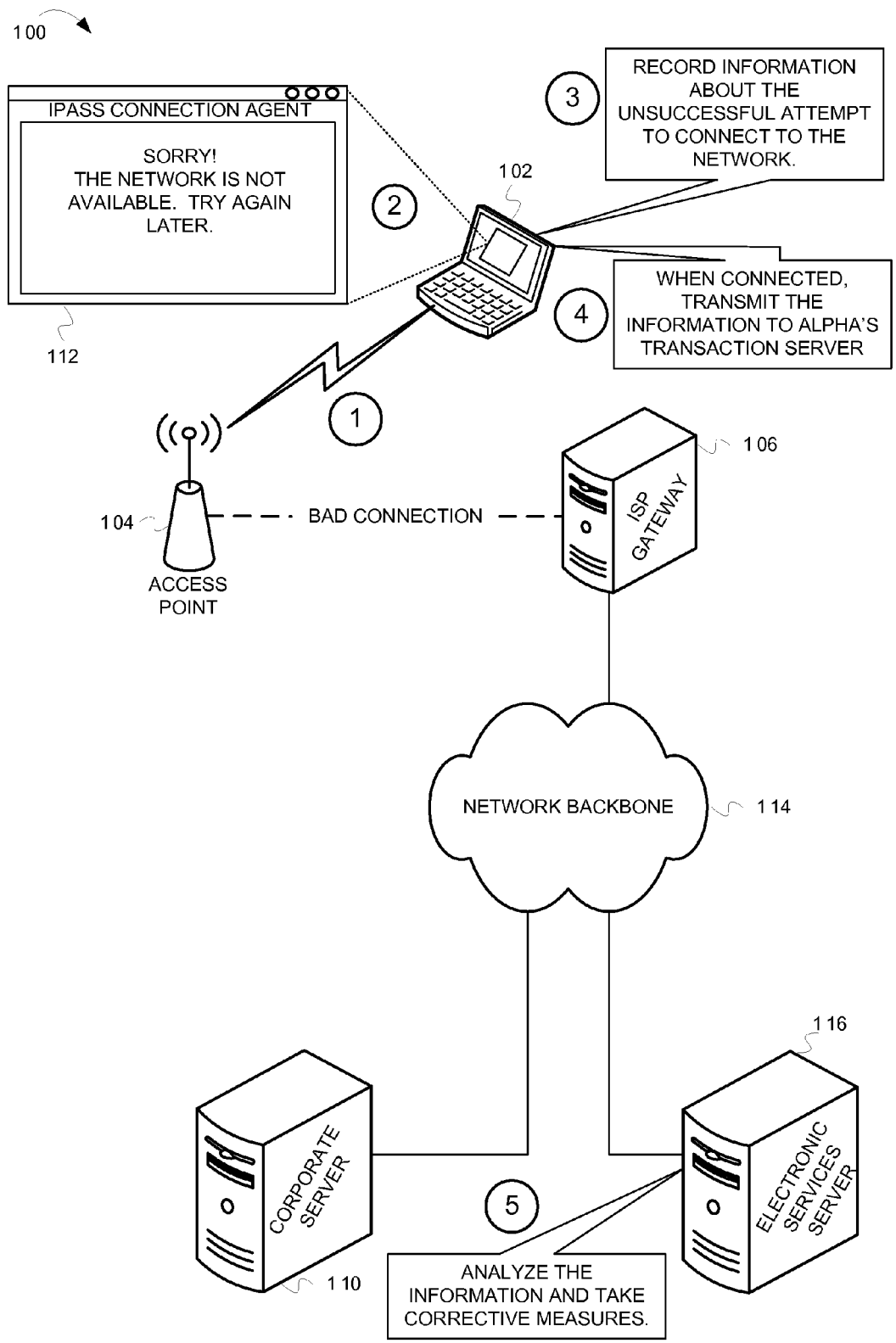
FIG. 1 is a conceptual diagram showing how a service provider relies on a supply chain.

The above-described supply chain problem is not unique to internet websites. Other electronic service providers encounter similar challenges, as disparate supply chain components can affect service quality and customer perception. FIG. 1 is a conceptual diagram showing how an electronic service provider relies on a supply chain. In FIG. 1, a service supply chain 100 includes an access point 104, ISP gateway 106, network backbone 114, electronic services server 116, and corporate server 110. Typically, supply chain components are owned and operated by different entities. For example, a coffee shop may own the access point 104, an internet service provider may own the ISP gateway 106, a telecommunications company may own the network backbone 114, and an electronic services company may own the electronic services server 116. Because the entities are disparate, each entity maintains its components independent of the other entities. As a result, the electronic services company may have difficulty identifying supply chain components that affect its quality of service (or how customers perceive its quality of service).

Some embodiments of the inventive subject matter enable electronic service providers to correlate and analyze data collected by the different entities. As a result, some embodiments enable electronic service providers to detect and remedy supply chain problems, thereby helping service providers maintain high qualities of service and customer satisfaction. FIG. 1 shows an overview of some embodiments.

FIG. 1 shows five stages of operation in a telecommunications supply chain. As noted, problems in the supply chain can affect how a service provider's customers perceive the service provider's quality of service. In the supply chain 100, the connection agent 112 can be tailored to work with the electronic services server 116 and may be provided by the same company. During stage one, a user computer's connection agent 112 attempts to establish a connection to the electronic services provider 116. To establish the connection, the connection agent 112, access point 104, ISP gateway 106, and network backbone 116 must all cooperate successfully. As shown, a "bad connection" between the access point 104 and ISP gateway 106 keeps the connection agent 112 from connecting to the electronic services server 116. During stage two, the connection agent 112 presents a message informing a user that it cannot connect to the electronic services server 116. Although the problem is unrelated to components provided by the electronic service provider (i.e., the connection agent 112 and electronic services server 116), a user may believe the connection failure was caused by the electronic service provider.

During stage three, the connection agent 112 records connection information about the unsuccessful connection. The connection information can indicate supply chain components that may have caused the connection failure. For example, the connection information can indicate that the agent 112 interacted with the access point 104, but could not connect to the ISP gateway 106. Additionally, the connection information can identify the access point 104 by its Media Access Control (MAC) address or other unique identifier. In other situations, the agent 112 can indicate errors with hardware or software on the user computer 102, and information about and possible errors in the configuration of the connection agent 112, etc.

Stage four occurs after the connection agent 112 successfully connects to the electronic services server 116. Stage four may occur much later, when the user computer 102 can connect to a different access point. During stage four, the connection agent 112 transmits the connection information to the electronic services server 116. During stage five, the electronic services server 116 analyzes the connection information and other information (e.g., AAA information received from the ISP gateway 106 or other components) to determine that the ISP gateway 106 is inaccessible. Additionally, the electronic services server 116 can correlate the information with other data to determine a street address, telephone number, or other location information about the venue at which the troubled component resides. The electronic services company can inform the ISP and coffee shop that their components at specific locations may be malfunctioning.

While FIG. 1 describes some features of the inventive subject matter, other features are described in more detail below.

Architectures and Operating Environments

This section presents structural aspects of some embodiments of the inventive subject matter. In particular, this section describes supply chain architectures and operating environments.

Figure 2:
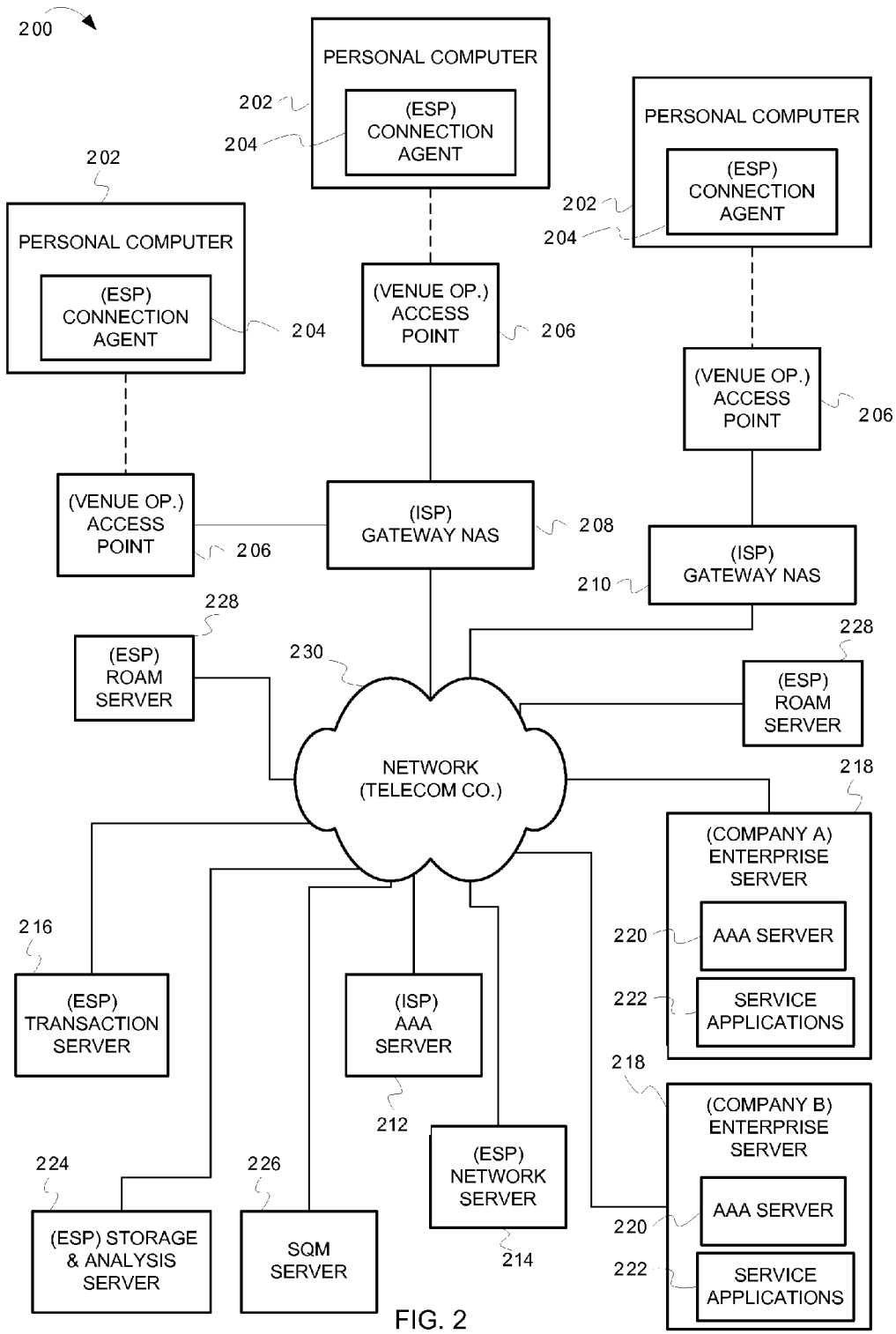
FIG. 2 is a block diagram illustrating a supply chain architecture, according to some embodiments of the invention.

FIG. 2 is a block diagram illustrating a supply chain architecture, according to some embodiments of the invention. The discussion of FIG. 2 will describe components of a network supply chain, how the components facilitate network connectivity for users, and how some components compile information useful in detecting irregularities (e.g., faults, unavailability, low performance) in supply chain components.

Supply Chain Components

In FIG. 2, a supply chain 200 includes personal computers 202 equipped with connection agents 204. Although not shown in FIG. 2, the connection agents 204 can reside in personal digital assistants, cell phones, laptop computers, and other devices. The personal computers 202 can connect to access points 206, which are connected to gateway network access servers (NASs) 208. The gateway NASs 208 are connected to a network 230 that can include media (e.g., copper wire, fiber optic cables, etc.), switches, routers, and other components for transmitting electronic communications to the components of the supply chain 200. In some instances, the network 230 can be part of other networks, such as public switched telephone networks, cable television networks, cellular telephone networks, etc. In FIG. 2, the network 230 is connected to enterprise servers 218, a network server 214, AAA servers 212, a storage and analysis server 224, and a transaction server 216. The AAA servers 212 can support RADIUS, DIAMETER, TACS, Web/Soap, Directory Services x.500, and any other suitable protocols. While some embodiments presented below process data in RADIUS format, those and other embodiments can use any suitable AAA protocol.

The supply chain 200 includes components controlled by an electronic services provider (ESP). In some instances, the ESP manages network connectivity between the connection agents 204 and enterprise servers 218, and provides security services during the connectivity. However, in some instances, the ESP is not an ISP. The ESP can manage network connectivity using its connection agents 202 and logic in the gateway NASs 210. The NASs 210 can assist the ESP by routing network connection requests to the ESP's network server 214 or other ESP components. The ESP's components can process the connection requests and facilitate network connections. The example below describes how the ESP uses its own components and the supply chain to help a company's employees connect (i.e., users) with the company's computer (i.e., an enterprise server 218).

Managing Connectivity

Users can establish connections to the network 230 using the connection agents 204 and personal computers 202. A personal computer's connection agent 204 can begin by connecting to an access point 206. In turn, the access point 206 can send a connection request to a gateway NAS 210. In turn, the gateway NAS 210 can transmit, to the connection agent 204, a login page (e.g., an HTML document) requesting access credentials (e.g., a user identifier and password). The connection agent 204 can transmit the access credentials back to the gateway NAS 210, which can forward a AAA connection request to the AAA server 212. The AAA server 212 can forward the connection request to the ESP's network server 214, which can translate the request from AAA format to Secure Socket Layer (SSL) format or any other suitable format. Based on information in the connection request (e.g., a customer identifier), the transaction server 216 can determine which of the ESP's roam servers 228 can process the connection request. The transaction server 216 can forward the connection request to the proper roam server 228, while also forwarding the connection request and some additional information (e.g., a timestamp, unique sequence number, etc.) to the storage and analysis server 224.

The roam server 228 includes information for determining which enterprise server 218 can process the connection request. The roam server 228 can request that an enterprise server's AAA server 220 authenticate the user credentials. Based on the enterprise server's response, the roam server 228 can send to the transaction server 216 a message granting/denying the connection request. Ultimately, the connection grant/denial message propagates back to the connection agent 204. If the connection request is granted, the connection agent 202 can connect to the network 230 and communicate with an enterprise server 218.

Compiling Supply Chain Data

In some embodiments, the storage and analysis server 224 compiles data about the various supply chain components. As noted above, the ESP's transaction server 216 can process AAA data (i.e., connection requests and connection responses) and forward information included in the AAA data to the storage and analysis server 224. Additionally, as network connections begin and end, the ISP's AAA server 212 can create and forward AAA accounting start and accounting stop records to the ESP's transaction server 216. The ESP's transaction server 216 can forward the AAA accounting records to the storage and analysis server 224. The ISP and ESP may use the AAA accounting start and accounting stop records for billing. For example, the ESP may remunerate the ISP for connections indicated in the AAA accounting records.

In addition to the AAA data, the storage and analysis server 224 can receive information about failed connection attempts. In some instances, the ESP's connection agents 204 can send the storage and analysis server 224 information about authentication errors, unavailable access points 206, gateway NASs errors, personal computers errors, etc. The connection agents 204 can send the information during successful network connections, and the information can be in any suitable format (e.g., SQM records).

The storage and analysis server 224 can receive yet another type of information. In some instances, the storage and analysis server 224 receives provisioning data describing components of the supply chain 200. For example, the provisioning data can include venue information (e.g., street address, etc.), access point attributes (e.g., MAC address, brand, model, etc.), gateway NAS attributes (e.g., provider name, protocol information, etc.), etc. The ESP's partners (e.g., ISPs, Venue operators, etc.) may provide the provisioning data to assist the ESP in configuring components for interoperability.

As the storage and analysis server 224 compiles the AAA data, connection agent data, and provisioning data, it can process the information to detect irregularities in the supply chain 200. This discussion of supply chains describes embodiments in which ISPs facilitate connectivity for various computers and devices. However, in some embodiments, the computers and devices can connect to the network using other connection services. The following discussion presents additional details about some embodiments of a storage and analysis server.

Storage and Analysis Servers

Figure 3:
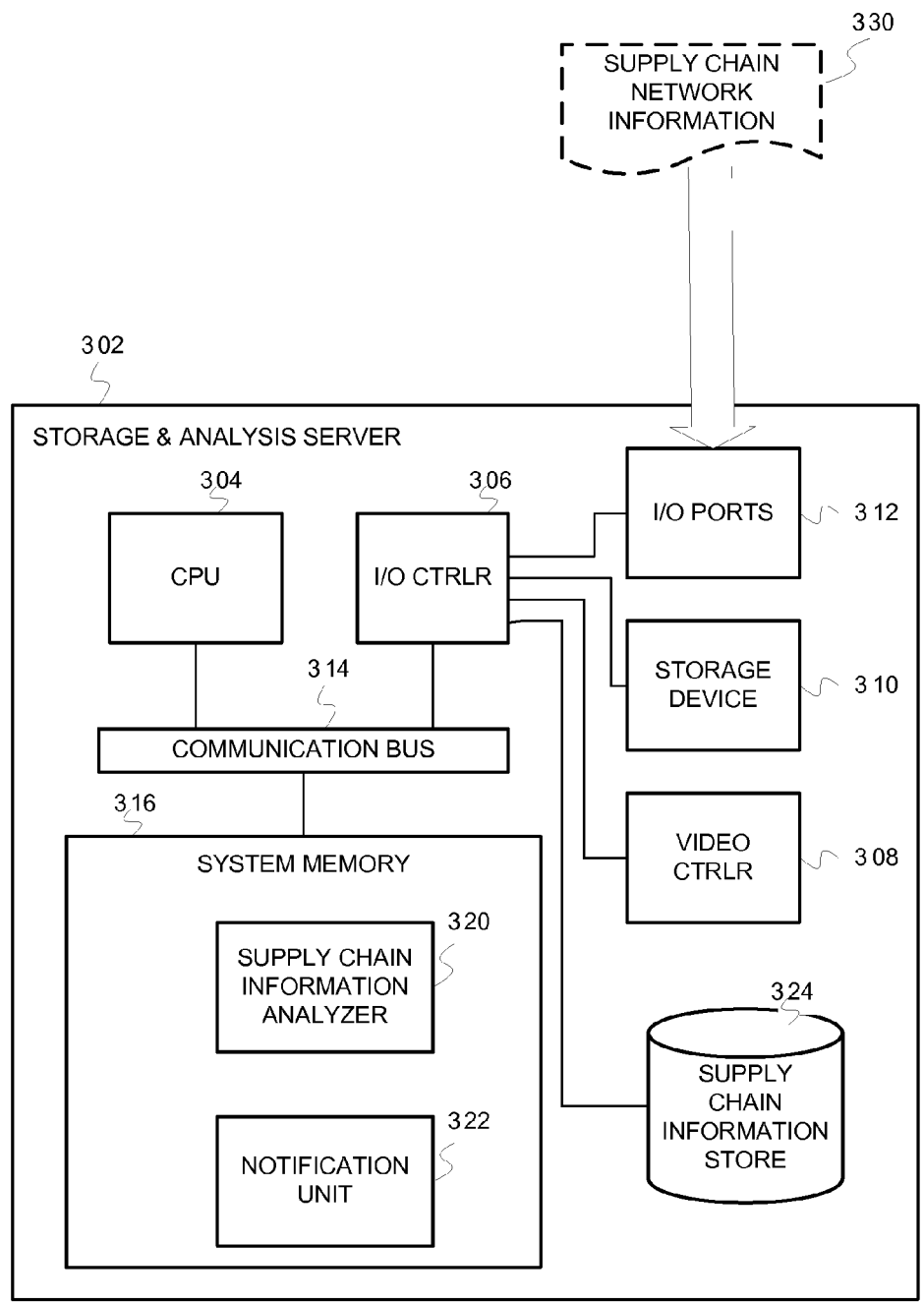
FIG. 3 is a block diagram illustrating a storage and analysis server, according to some embodiments of the invention.

FIG. 3 is a block diagram illustrating a storage and analysis server, according to some embodiments of the invention. In FIG. 3, the storage and analysis server 302 includes a central processing unit (CPU) 304 connected to a communication bus 314. The communication bus 314 is connected to an input output controller 306, which is connected to a video controller 308, storage device 310, and input/output ports 312, and supply chain information store 324. The communication bus 314 is also connected to a system memory 316. The system memory 316 includes a supply chain information analyzer 320, supply chain information 318, and notification unit 322.

As the storage and analysis server 302 receives supply chain information 330 (e.g., from an ESP's transaction server), the server 302 can store information in a supply chain information store 324. The supply chain information analyzer 320 can analyze the supply chain information and detect irregularities, such as low performance, usually high component unavailability, usually high fault rate, etc. The supply chain information analyzer 320 can also determine location information for specific supply chain components, verify provisioning information, determine network topology, etc. Upon detecting irregularities, the notification unit 322 can notify technicians and others about the irregularities. In some instances, the notifications can include location information, such as a street address, indicating where troubled components reside.

In some embodiments, the storage and analysis server 302 can include additional peripheral devices and/or more than one of each component shown in FIG. 3. For example, in one embodiment, the storage and analysis server can include multiple CPUs 304. In some embodiments, any of the components can be integrated or subdivided. Additionally, in some embodiments, the components of the server 302 can be interconnected according to any suitable interconnection architecture (e.g., directly connected, hypercube, etc.). Also, the server's components can include any data structures (e.g., queues, stacks, arrays, linked lists, etc.) suitable for performing the functionality described herein. Similarly, any of the above-described supply chain components can be integrated, subdivided, or organized differently.

Any of the embodiments described herein (e.g., those shown in FIGS. 1-3) can include instructions stored on machine-readable media, where the instructions perform functions described herein. Machine-readable media includes any mechanism that provides (i.e., stores and/or transmits) information in a form readable by a machine (e.g., a wagering game machine, computer, etc.). For example, tangible machine-readable media includes semiconductor read only memory (ROM), semiconductor random access memory (RAM), magnetic storage media, optical storage media, flash memory devices, etc. Machine-readable media also includes any media suitable for transmitting software over a network.

While FIG. 3 describes components and functionally of some storage and analysis servers, the discussion continues with more details about how storage and analysis servers can process supply chain data.

Figure 4:
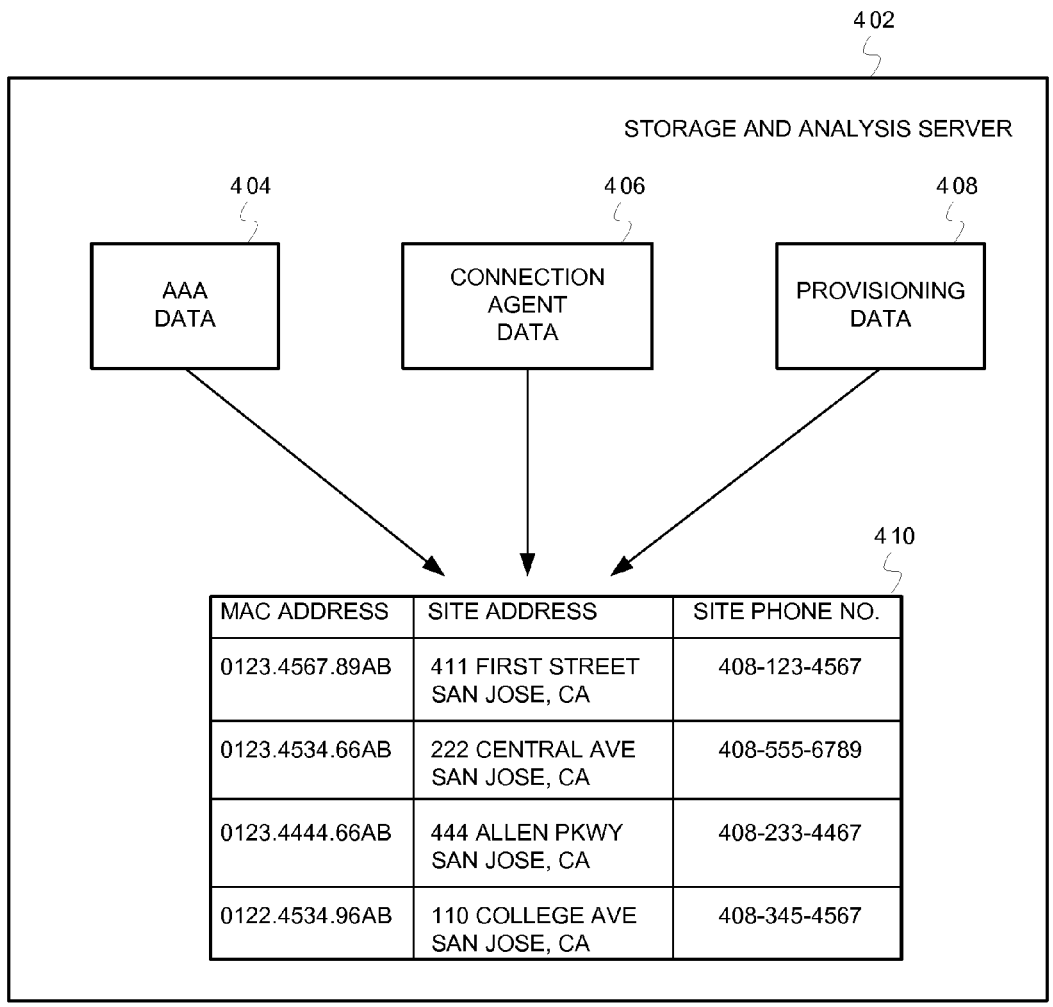
FIG. 4 is a conceptual diagram illustrating how an ESP's storage and analysis server can process and correlate data about different supply chain components, according to some embodiments of the invention.

FIG. 4 is a conceptual diagram illustrating how an ESP's storage and analysis server can process and correlate data about different supply chain components, according to some embodiments of the invention. In FIG. 4, a storage and analysis server 402 includes AAA data 404, connection agent data 406, and provisioning data 408. In some embodiments, the AAA data 404 originates from ISP components (e.g., gateway NAS), while the connection agent data 406 originates at an ESP's connection agent. The provisioning data 408 can originate from a venue operator, an ISP, or a company maintaining an enterprise server. The AAA data 404 indicates network traffic and other activities, but may not tie those activities back to particular access points. The provisioning data 408 identifies access points by venue, but may not identify access points by MAC address, nor does the provisioning data 408 include information about network traffic.

Even though the data (404, 406, & 408) originates at different actors in a supply chain, embodiments of the storage and analysis server 402 can correlate the data to derive useful information. For example, the server 402 can derive the table 410 from the AAA data 404, connection data 406, and provisioning data 408. The table 410 includes fields indicating access points' MAC addresses, street addresses at which the access points reside, and telephone numbers for venues at which the access points reside. In some embodiments, the table 410 can include any suitable location identifiers, such as longitude and latitude coordinates, etc. Some embodiments can use external facilities (e.g., Google Maps API) to determine map information (e.g., longitude & latitude) from street addresses in the provisioning data.

If the server 402 only compiled the disparate data, it would not have the information in the table 410. Because the server 402 can process and correlate the data 404, 406, & 408, it can create table 410, which includes information identifying access points and street addresses at which they can be found. Without such correlation, the disparate data 404, 406, & 408 is less useful for remedying irregularities in a supply chain. For example, without the data processing and correlation, if supply chain actors identify problems at a given MAC address, they may have difficulty physically locating the access point.

Embodiments of the storage and analysis server 402 are not limited to determining street addresses and phone numbers for access points. Instead, they can correlate the data 404, 406, & 408 to detect poor performance, unavailability, inaccuracies in the provisioning data, and much more.

Operations

This section describes operations performed in connection with some embodiments of the invention. In the discussion below, the flow diagrams will be described with reference to the block diagrams presented above. In certain embodiments, the operations are performed by executing instructions residing on machine-readable media (e.g., software), while in other embodiments, the operations are performed by hardware and/or other logic (e.g., firmware). In some embodiments, the operations are performed in series, while in other embodiments, one or more of the operations can be performed in parallel.

Figure 5:
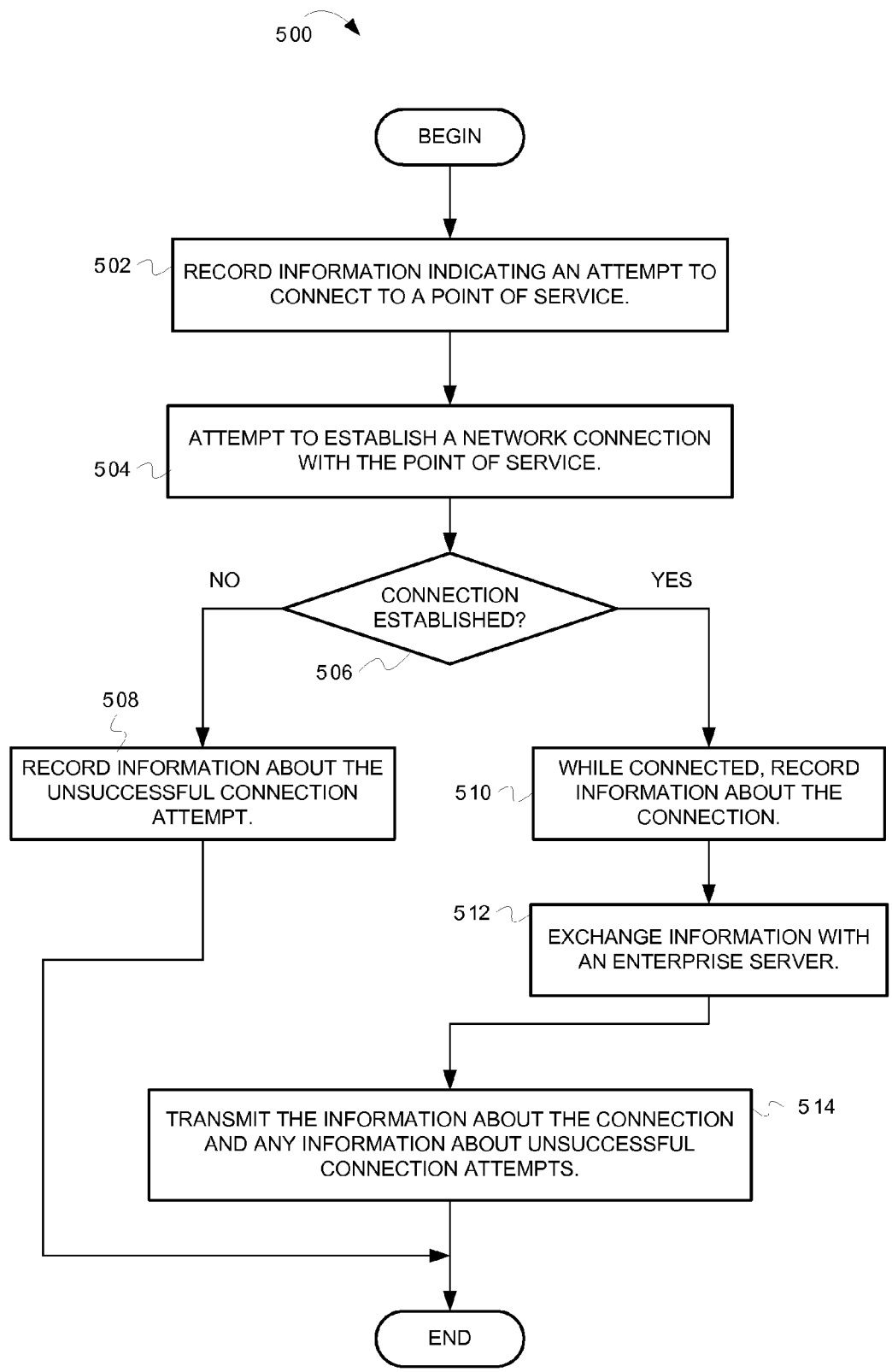
FIG. 5 is a flow diagram illustrating operations for recording information about network connections, according to some embodiments of the invention.

FIG. 5 is a flow diagram illustrating operations for recording information about network connections, according to some embodiments of the invention. In the following discussion, a connection agent performs the operations shown in FIG. 5. The flow diagram 500 begins at block 502.

At block 502, a connection agent records information about an attempt to connect to an access point. The information can include access point identifiers, such as access point MAC addresses, access point service set identifier (SSID), telephone numbers used for connecting to a network, municipal Wi-Fi identifiers, information identifying a connection service, etc. The information can also include user identifiers, user passwords, times of day, etc. In some cases, the information may indicate that an access point or other supply chain component is not available. The flow continues at block 504.

At block 504, the connection agent attempts to establish a network connection. As part of the connection attempt, the connection agent can transmit a log-in request to a gateway NAS via the access point. In turn, the connection agent may also send log-in credentials (e.g., a user identifier and password) in response to a request from the gateway NAS. The flow continues at block 506.

At block 506, the connection agent determines whether the network connection has been established. In some instances, the connection agent receives a network access grant/denial message indicating whether the connection is granted or denied (see discussion of FIG. 2 above). In other instances, the connection agent may not receive a grant/denial message at all, as one or more supply chain components may be malfunctioning or otherwise unavailable. If the network connection is not established, the flow continues at block 508. Otherwise, the flow continues at block 510.

At block 508, the connection agent records information about the unsuccessful network connection attempt. The information can indicate why the connection was unsuccessful. For example, the information can indicate errors associated with: a computer on which the connection agent is executing, the connection agent itself, the access point, the gateway NAS, and/or any other component of the supply chain. The information can also indicate that the access request was denied and why (e.g., because user credentials were rejected). During a later successful connection, the connection agent can transmit the information to a storage and analysis server. From block 508, the flow ends.

At block 510, during a successful network connection, the connection agent records information about the connection. For example, the connection information can include information indicating: 1) network performance (e.g., response time), 2) number and type of packets transmitted and received, 3) communication errors, 4) source of packets transmitted, 5) destination of packets received, 6) etc. In some embodiments, even though block 510 appears before some network transmissions, the connection agent records information for the duration of the connection. The flow continues at block 512.

At block 512, the connection agent exchanges information with an enterprise server. This can include exchanging documents, files, and other information with the enterprise server. In some cases, the primary reason for establishing the network connection is to access information on the enterprise server. The flow continues at block 514.

At block 514, the connection agent transmits all recorded information about the current connection and any previous unsuccessful connections to a storage and analysis server. The recorded information can be in the form of SQM records or in any other suitable form. From block 514, the flow ends.

As connection agents perform the flow 500, a storage and analysis server begins building a database of information about the supply chain components. Although in some embodiments connection agents can perform the operations of the flow 500, there are other embodiments in which other components can perform those operations. While FIG. 5 describes how a connection agent can establish network connections and report connection information, FIG. 6 describes how supply chain components process network requests. This discussion continues with FIG. 6.

Figure 6:
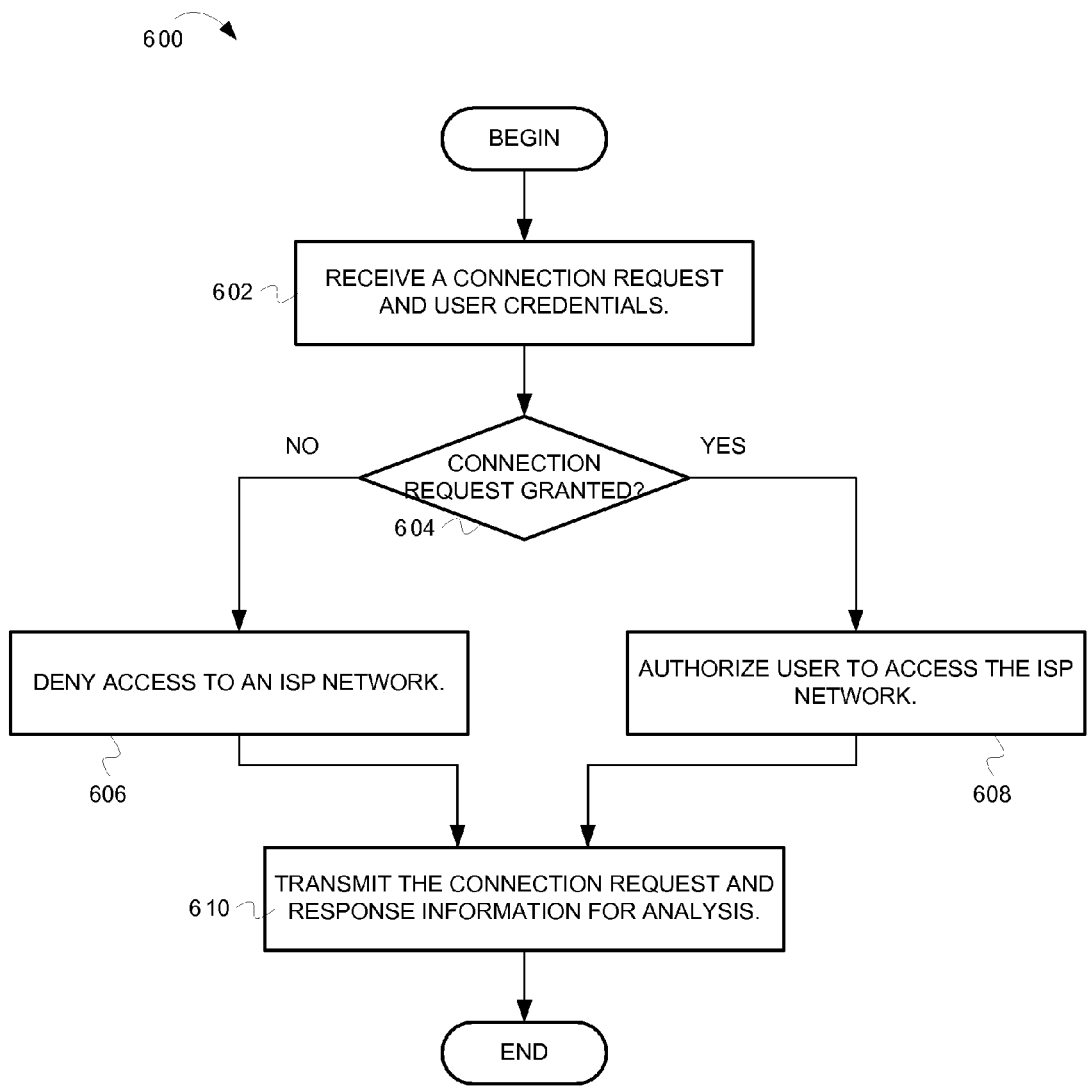
FIG. 6 is a flow diagram illustrating operations for processing network connection requests in a supply chain network, according to some embodiments of the invention.

FIG. 6 is a flow diagram illustrating operations for processing network connection requests in a supply chain network, according to some embodiments of the invention. In some embodiments, a transaction server performs the operations of the flow diagram 600. The flow 600 begins at block 602.

At block 602, a transaction server receives a connection request and user credentials. The connection request and user credentials can be formatted as a RADIUS protocol authentication request. In some embodiments, the transaction server reformats the connection requests and user credentials according a different protocol (e.g., SSL) and forwards them down the supply chain for authentication (e.g., ultimately to an enterprise server's AAA server). The flow continues at block 604.

At block 604, the transaction server determines whether the connection request has been granted. In some embodiments, the transaction server receives a connection response from the enterprise server or other upstream supply chain component. If the connection request has been denied, the flow continues at block 606. Otherwise, the flow continues at block 608.

At block 606, the transaction server transmits a connection response denying the connection request. In some embodiments, the connection response travels to a connection agent through a network server, AAA server, gateway NAS, and access point. The transaction server can format the connection denial message according to RADIUS or other suitable protocol. The flow continues at block 610.

At block 608, the transaction server transmits a connection response granting the connection request. In some embodiments, the connection response travels to a connection agent through a network server, AAA server, gateway NAS, and access point. The transaction server can format the connection grant message according to RADIUS or other suitable protocol. The flow continues at block 610.

At block 610, the transaction server transmits the connection request and response information to a storage and analysis server. As noted above, the connection request and response information can be in the RADIUS format and it can include additional information (e.g., ESP sequence number, timestamp, etc.). From block 610, the flow ends.

Although not shown in FIG. 6, the transaction server can also perform operations for resolving billing between an ESP and ISP. As such, the transaction server can receive additional AAA information (from the ISP), such as AAA stop and start records, which indicate ISP usage. In some embodiments, the transaction server transmits this billing information (e.g., AAA accounting start and accounting stop records) to the storage and analysis server. Over time, the transaction server can send volumes of billing information and connection information (described in FIG. 6) to the storage and analysis server. Thus, the storage and analysis server can compile a larger volume of AAA information.

In the discussion above, the operations of FIGS. 5 & 6 describe how the supply chain components can send information to a storage and analysis. The discussion continues with a description of how a storage and analysis server can receive, process, and utilize the supply chain network information.

Figure 7:
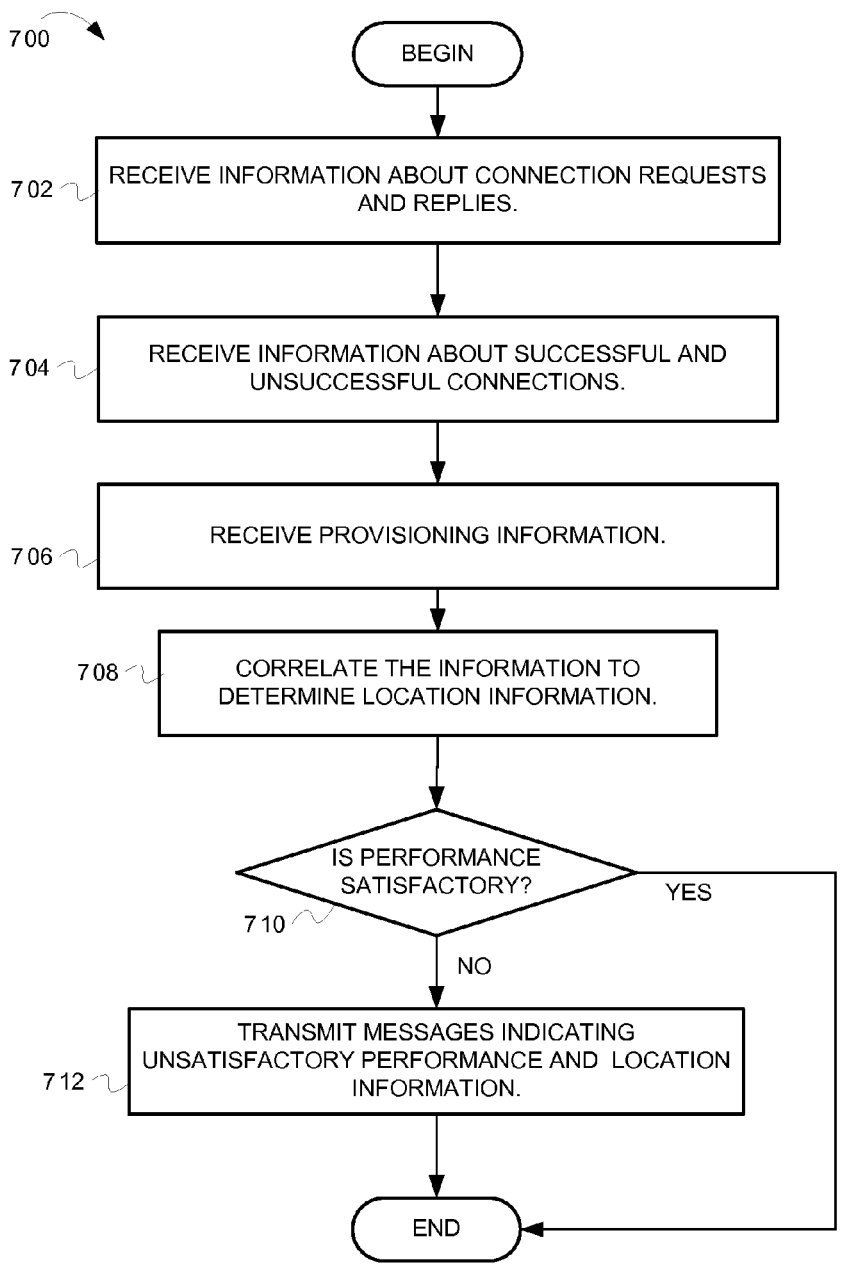
FIG. 7 is a flow diagram illustrating operations for receiving and processing information about components of a supply chain network, according to some embodiments of the invention.

FIG. 7 is a flow diagram illustrating operations for receiving and processing information about components of a supply chain network, according to some embodiments of the invention. The flow 700 begins at block 702.

At block 702, a storage and analysis server receives information about connection requests and replies and when connections begin and end. In some embodiments, the connection information is in AAA format (e.g. RADIUS connection request and reply records, and RADIUS start and stop records). In other embodiments, the information is derived from AAA connection requests and AAA connection replies. The flow continues at block 704.

At block 704, the storage and analysis server receives, from connection agents, information about successful and unsuccessful connections. The information can indicate whether certain supply chain components were unavailable, exhibiting errors, exhibiting slow performance, and other irregularities. Additionally, the information can describe communication traffic to/from the connection agents (e.g., the information can describe response time, error rates, etc.). The flow continues at block 706.

At block 706, the storage and analysis server receives provisioning information. As described above, the provisioning information can include information about supply chain components, such as their location, brand, configuration, etc. The discussion of FIG. 8 (below) describes some example provisioning data. The storage and analysis server receives the provisioning information from a transaction server or other component. Although FIG. 7 shows the storage and analysis server receiving the different supply chain network information in sequential fashion, it can receive the supply chain network information in any order and at varying times. The flow continues at block 708.

Figure 8:
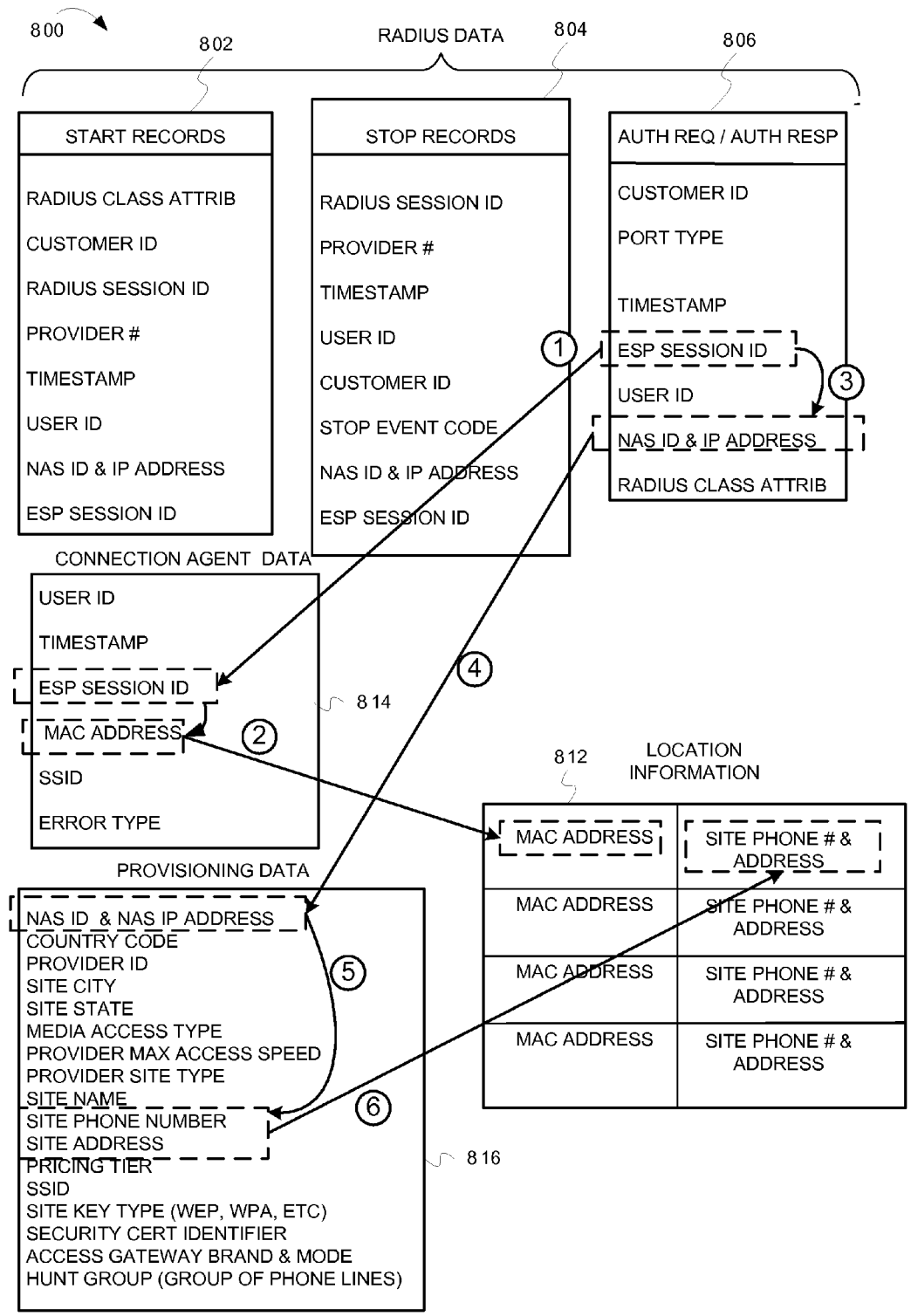
FIG. 8 is a conceptual diagram illustrating how supply chain network information can be correlated to indicate location information and other useful information, according to some embodiments of the invention.

At block 708, the storage and analysis server correlates the supply chain network information received during the operations at blocks 702, 704, & 706. In some embodiments, the storage and analysis server maintains a relational database for storing the supply chain network information. FIG. 8 describes how some embodiments of the storage and analysis server can store and correlate the supply chain network information.

FIG. 8 is a conceptual diagram illustrating how supply chain network information can be correlated to indicate location information and other useful information, according to some embodiments of the invention. In some embodiments, the storage and analysis server can store the data received at blocks 704, 705, & 706 (i.e., AAA data, connection agent data, and provisioning data ) in database tables, as shown in FIG. 8. In FIG. 8, the AAA data appears as RADIUS data including tables for start records, stop records, and authentication requests and responses. Each table 802, 804, & 806 represents a plurality of RADIUS records, where the text appearing in each table indicates the fields in a record of the table. In particular, each RADIUS start record in the table 802 includes the following fields: RADIUS class attribute, customer ID, RADIUS session identifier, provider number, timestamp, user identifier, NAS identifier and IP address, and ESP session identifier. Each RADIUS stop record in the table 804 includes the following fields: RADIUS session identifier, provider number, timestamp, user identifier, customer identifier, NAS identifier and IP address, stop event code, and ESP session identifier. Each RADIUS authentication request/response record in the table 806 includes the following fields: customer identifier, port type, user identifier, timestamp, ESP session identifier, NAS identifier and IP address, and RADIUS class attribute.

In FIG. 8, the table 814 represents a plurality of records including connection agent data. The text in the table 814 represents fields in each record. The fields include: user identifier, timestamp, MAC address, SSID, and error type. The table 816 represents provisioning data, which can include a plurality of records. In the provisioning data table 816, each record includes the following fields: NAS identifier and IP address, country code, provider identifier, site city, site state, media access type, provider maximum access speed, provider site type, site name, site phone number, site address, pricing tier, SS ID, site key type (WEP, WPA, etc.), security certificate identifier, access gateway brand and mode, and hunt group.

As noted in block 710 of FIG. 7, the storage and analysis server can correlate its supply chain network information (e.g., RADIUS data, connection agent data, and provisioning data). FIG. 8 shows one way the storage and analysis server can correlate the supply chain network information to determine location information useful in remedying network irregularities. In FIG. 8, the storage and analysis correlates the data in six stages. During stage one, the storage and analysis server's information analyzer 320 locates an ESP session identifier field in a record in table 806. The information analyzer 320 can use the record's ESP session identifier value to search for records in the connection agent data table 814 that have the same ESP session identifier value. After finding a connection agent data record with a matching ESP session identifier value, the information analyzer 320 finds an access point MAC address value in the connection agent data record.

During stage two, the information analyzer 320 creates a new location information table 820 that has a plurality of records, each record containing: an access point MAC address field, and a site phone number & address field. As shown, the information analyzer 320 inserts the access point MAC address value (identified during stage one) into a record in the location information table 820.

During stage three, the information analyzer 320 refers back to the record it found in the authentication request/ response table 806 and locates the record's NAS identifier and IP address field. During stage four, using the NAS identifier and IP address value, the information analyzer 320 searches the provisioning data table 816 for a record having a matching NAS identifier and IP address value. After finding such a record, the information analyzer 320 finds a site phone number and site address in the record (stage five). During stage six, the information analyzer 320 inserts the site phone number and site address into the location information table 812, in the record containing the access point MAC address value (received during stage 2). In some embodiments, the storage and analysis server can send the location information to field technicians, assisting them in finding access points that are exhibiting irregularities (see discussion below).

The information analyzer 320 can create more location information (i.e., more records in the table 812) by repeating the correlation process for a plurality of RADIUS authentication request/response records in the table 806. In some embodiments, the storage and analysis server can includes different tables and perform different correlations. For example, in some embodiments, the storage and analysis server can determine whether access points are available by correlating RADIUS start and stop records to access point MAC addresses.

Referring back to FIG. 7, after the storage and analysis server correlates the information received at blocks 702, 704, & 706, the flow continues at block 710. At block 710, the storage and analysis server determines whether supply chain network performance is satisfactory. For example, the storage and analysis server can evaluate the RADIUS data to determine whether NASs are available and processing traffic. As another example, the server can evaluate the connection agent data to determine whether connection agents are having difficulties connecting to particular access points. In some embodiments, this operation includes addition correlation between the supply chain network information. The flow continues at block 712.

At block 712, the storage and analysis server transmits a message indicating that one or more supply chain network components are exhibiting unsatisfactory performance. In some embodiments, the message includes information identifying a particular supply chain network component and location information indicating a street address or other physical location identifier. For example, the storage and analysis server can transmit a message to a venue operator, where the message includes a MAC address identifying an access point and a street address at which the access point resides. In turn, the venue operator can deploy technicians to repair the access point identified in the message. From block 712, the flow ends.

Some embodiments can perform the flow 700 periodically or in real-time. For example, some embodiments may receive and correlate the information every day/week/month. However, other embodiments may constantly receive and correlate the information.

Figure 9:
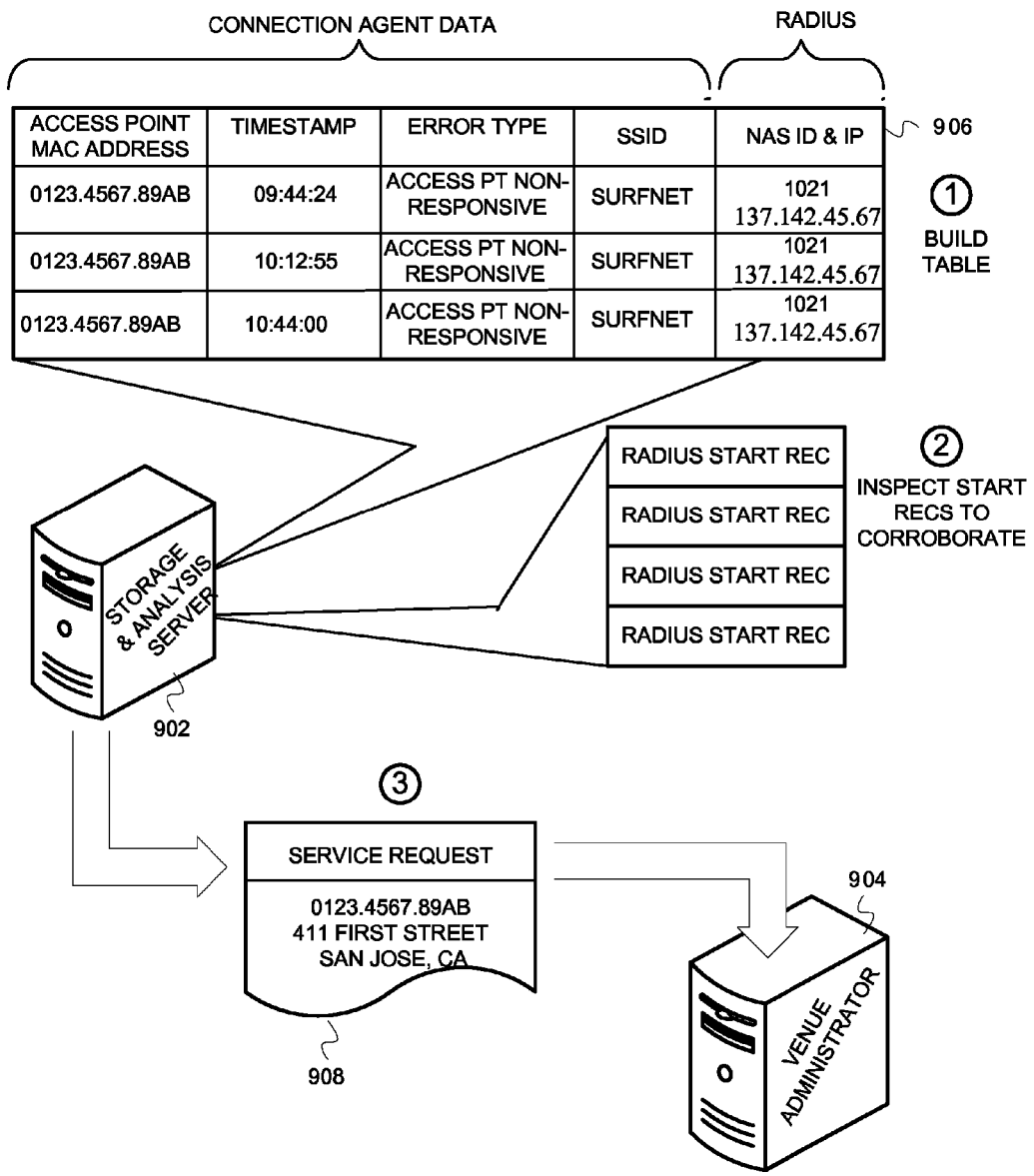
FIG. 9 is a conceptual diagram illustrating operations and data flow associated with supply chain data correlation and operator notification.

The discussion continues with another example of how some embodiments of the storage and analysis server can correlate supply chain network information and notify supply chain operators about irregularities. FIG. 9 is a conceptual diagram illustrating operations and data flow associated with supply chain data correlation and operator notification. In the embodiment shown in FIG. 9, the storage and analysis server 902 can include tables including RADIUS data, connection agent data, and provisioning data (similar or identical to the tables in FIG. 8). Although this example shows RADIUS data, other embodiments store AAA data in other formats, such as DIAMETER, TACS, etc.

FIG. 9 shows three stages of operations and data flow. During stage one, the storage and analysis server 902 builds a table 906 by correlating connection agent data with RADIUS data. The records of table 906 indicate times at which a particular access point was not available. Each record in the table 906 includes the following fields: access point MAC address, timestamp, error type, SSID, and NAS identifier & IP address. The server 902 can determine values for the access point MAC address, timestamp, SSID, and error type fields from connection agent data. The server 902 can determine the NAS identifier & IP address values from RADIUS data (e.g., so long as the RADIUS data includes at least one record that it can relate to a connection agent record—similar to stage one of FIG. 8).

During stage two, the server 902 inspects RADIUS start records to corroborate a conclusion that the access point identified in the table 906 is not responding. In some cases, if the connection agent data includes an SSID, the non-responsive access point error may arise when the connection agent fails to associate with the access point. If the connection agent data does not include an SSID, the error may arise for other reasons.

If the server 900 cannot find any RADIUS start records associated with the NAS identified in the table 906, it has corroboration that the access point is not responding. However, if the server 902 finds some RADIUS start records associated with the NAS identified in table 906, the server 902 may look for more corroboration. For example, if the NAS identified in the table 906 servers a plurality of access points, some of the RADIUS start records may be from other access points. For more corroboration, the server 902 can compare the number of RADIUS start records in its database to statistics associated with the NAS. If the number of RADIUS start records is significantly below baseline statistics, the server 902 has corroboration that the access point is not responsive.

During stage three, after the corroboration, the server 900 transmits a service request 908 to a venue administrator computer 904. In some instances, the service request can identify the access point by its MAC address, a street address at which the access point resides, and other information.

Processing Supply Chain Network Data

This section describes additional features and embodiments of the inventive subject matter. As noted above, some embodiments of the storage and analysis server receive and maintain supply chain network information including connection agent data, RADIUS data, and provisioning data. The following discussion describes how some embodiments of the storage and analysis server can: 1) check for inconsistencies between provisioning data (i.e., data indicating how entities believe supply chain components are configured) and traffic information (i.e., communication traffic indicating how supply chain components are actually configured); 2) monitor network performance based on communication traffic; 3) monitor supply chain topology; and more. As the storage and analysis server discovers various supply chain conditions, it can notify entities and take remedial measures.

Data Model

Figure 10:
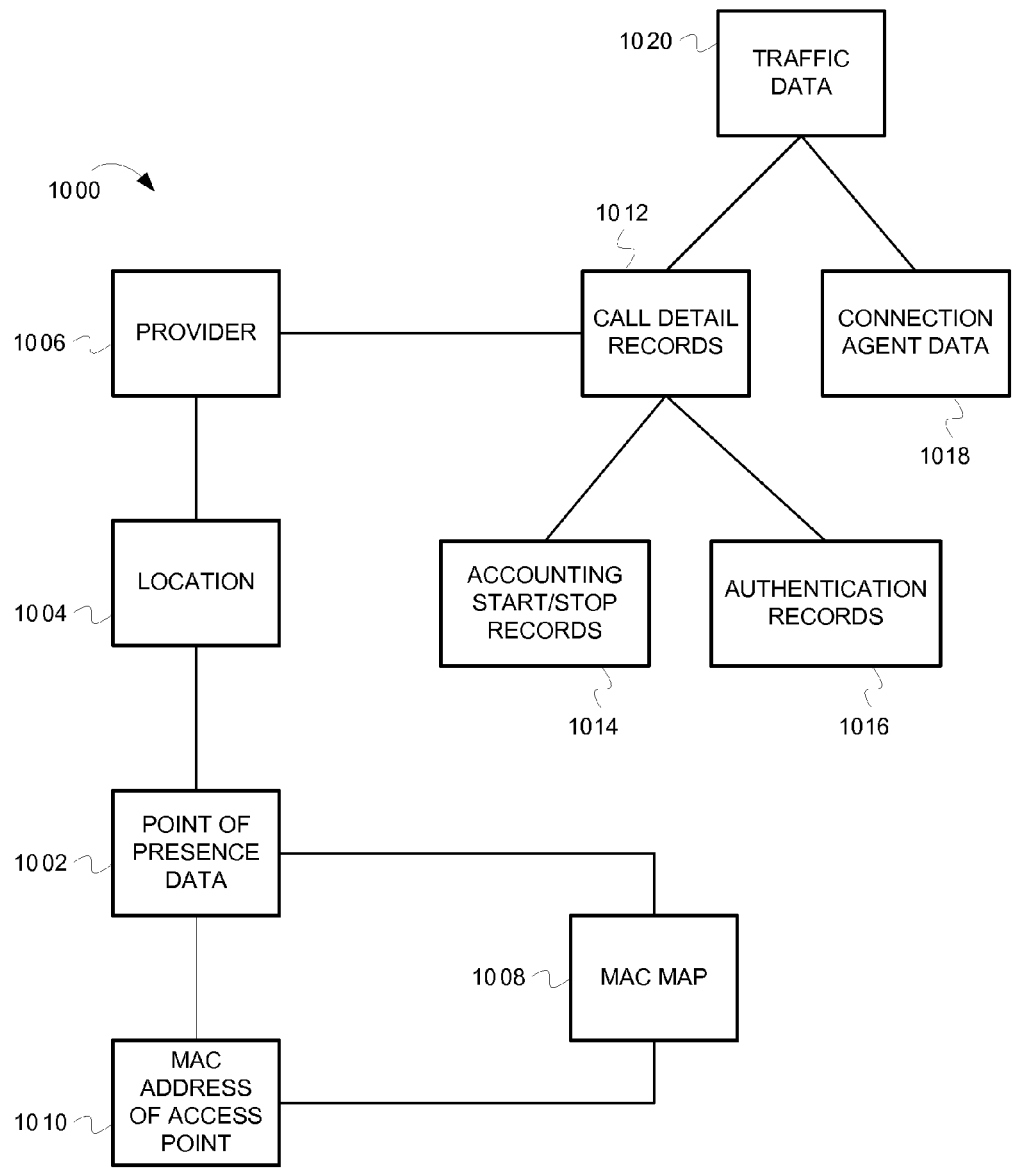
FIG. 10 is a data model associated with some embodiments of the invention.

The storage and analysis server can organize data according to a data model shown in FIG. 10. In the data model 1000, the provisioning data can be represented as tables 1002, 1004, & 1006. In some instances, the storage and analysis server receives provisioning data from entities that control components in the supply chain, so the provisioning data is considered authoritative. The point of presence (POP) records 1002 indicate a "physical" location (i.e. a location that can be looked-up on a Map) and the location records 1004 indicate only a "logical" location useful for Call Detail Record (CDR) billing and rating, but not for geographical identification. In FIG. 10, the table 1008 (i.e., MAC address map table) includes records correlating access points' MAC addresses to point of presence data 1010, tying access points to physical locations (e.g., the table 1008 can be a result of the correlation shown FIG. 8). In some instances, the point of presence data 1002 is part of the connection agent data received from connection agents (as described above). Associating the point of presence data 1002 with the MAC addresses 1010 can provide a finer geographical granularity relative to an association with location records 1004, which are available with CDR-based systems.

In some embodiments, the storage and analysis server (hereinafter referred to as "the server") creates CDRs 1012 by linking authentication records 1016 with accounting start and stop records 1014. The CDRs identify sessions in which an ESP has provided services and include information such as user identifiers, start times, session durations, SSIDs, providers, and locations. In some instances, the server creates the CDRs 1012 according to known pricing/rating/billing techniques. The server can link the authentication and accounting records in any suitable manner, such as by linking records that have identical ESP session identifiers. That is, the server can search for authentication and accounting records that have identical ESP session identifiers. For all records having the same ESP session identifier, the server can create a new record in the CDR table 1012, where the new record includes information from the authentication and accounting records (1014 & 1016). The CDRs 1012 include enough information to define connections for billing purposes. In some embodiments, the server can perform the linking based on timestamps or other parameters.

After creating the CDRs 1012, the server can also link the CDRs to connection agent data 1018 (e.g., using ESP session identifiers, timestamps, etc.). Linking the CDRs 1012 and connection agent data 1018 creates traffic data 1020, which indicates communication traffic on a supply chain network. The server can compare the traffic data 1020 to the provisioning data (i.e., tables 1002, 1004, & 1006) to determine whether they are consistent. As the server discovers inconsistencies between the traffic data 1020 and provisioning data, the server can report problems in the supply chain network.

Data Tables

In some embodiments, the server can create more tables based on data it has collected. In some embodiments, the server creates one or more of the tables M1-M4 (values in parenthesis are initial defaults) based on the provisioning data. The server can compare tables M1-M4 (created from provisioning data) to tables it creates from network traffic. The comparison can indicate whether the provisioning data accurately reflects how supply chain components are configured, supply chain network topology, supply chain network performance, etc.

| Table Name | Schema | Description |
| --- | --- | --- |
| M1 | Provider, SSID, newFlag(true), productionFlag(false) | Each record represents the provisioning status for each SSID for a given provider. When productionFlag is FALSE, it indicates that this SSID for this provider is provisioned, but not in production yet. When newFlag is TRUE, it indicates that this SSID for this provider has been added/provisioned in this snapshot interval. |
| M2 | Provider, SSID, NAS-IP, newFlag = true, productionFlag = false | Each record represents a Provider, SSID, NAS permutation. |
| M3 | Provider, Count of SSID, Count of AP MAC address, Count of {SSID, Mac-Ap} pairs | For a given provider, this table shows the indicated counts. They provide a summary indication of network topology at a given point in time. The server can detect topology changes by looking for mismatches between periodic snapshots and the currently accepted (provisioned) topology. Once a change is detected, the storage and analysis server can narrow its scope to pinpoint the exact change. Changes can be: reconciled against the provisioning system to update the known state, explained for further elaboration of the model (adding new data elements), and linked to usage statistics (traffic statistics) to determine alarm levels. |
| M4 | Provider, SSID, AP MAC address | This is a "drill-down" of M3, in which a full enumeration of the actual pairs is listed, .rather than just a count of {SSID, MAP-AP} pairs. |

As noted above, the server can link CDRs and connection agent records to form traffic data (see discussion of FIG. 10). In some embodiments, the server can create additional tables based on the traffic data. For example, the server can create tables C1-C6, as described below.

| Table Name | Schema | Description |
| --- | --- | --- |
| Base | Provider, SSID, AP MAC Address, Radius NAS IP address, Count of records | At any given time, Base represents all the connection access permutations derivable from the CDR/connection agent history. The count represents the number of |

-continued

| Table Name | Schema | Description |
|---|---|---|
| | matching this permutation | sessions in that bin category. This table is subsequently processed to produce the cardinality Tables c1-c6. |
| C1 | Provider, SSID, Count of AP MAC addresses, Count of NAS IP addresses | For each provider SSID, this table represents the number of distinct AP MAC addresses, and number of distinct NAS IP address. |
| C2 | Provider, SSID, NASIp | Enumerates NAS IPs for each Provider SSID. Each row constitutes a permutation. |
| C3 | Provider, SSID, Mac-AP | Enumerates MAC APs for each Provider SSID. Each row constitutes a permutation. |
| C4 | Provider, NASIp, SSID, Mac-AP | Enumerates NAS IPs and MAC APs for each Provider SSID. Each row constitutes a permutation. |
| C5 | Provider, count of SSID, count of Mac-AP, count of NASIp, count of {SSID, MAC-AP, NASIp} triples. | Each row is a summary for a given provider. |
| C6 | Provider, SSID, Mac-AP, count of NAS IPs | For each Provider SSID, MAC AP permutation this row indicates the number of distinct NASes. |

In some embodiments, the server can create different tables, or it can add fields to the tables shown above. For example, some tables can include an AP MAC address stored with the associated location id, POP id, number of times it has been correlated, and the date of the last correlation.

Traffic Aggregation

In some embodiments, the server extends the above-described tables with traffic metrics. For example, the server can create additional tables T1-T3. In tables T1-T3, traffic information (e.g., RADIUS records and other information) is associated with a particular permutation enumerated in Tables C1 to C4. For example, T2 can expand C2. The T2 schema can be: T2 schema:<Provider,SSID, NASIp, date, success-session-count, reject-session-count>

Model Verification/Update

As noted above, the server can draw conclusions about the supply chain network's topology and accuracy of the provisioning data. That is, the server can compare tables created from provisioning data (e.g., M tables) to tables created from traffic data (e.g., C tables). If the tables match, the provisioning data accurately reflects the supply chain network's configuration. However, if the tables do not match, the provisioning data may be inaccurate. Consider the following example.

The server can create an M1 table based on provisioning data. That is, the sever can search through the provisioning data and create records based on the M1 schema. An example M1 table appears below:

| Provider | SSID | newFlag | ProductionFlag |
|---|---|---|---|
| MEGAComm | XYZ | False | False |
| smallcom | abc | False | False |

According to the example M1 table, the provisioning data indicates that the supply chain network is configured for two providers (MEGAComm & smallcom), each using a different SSID (i.e., XYX & abc). Next, the server can create a C1 table based on traffic data. An example C1 table appears below.

| Provider | SSID | MAC Count | NAS Ip Count |
|---|---|---|---|
| MEGAComm | XYZ | 40 | 10 |
| smallcom | abc | 5 | 1 |
| NewComm | 123 | 10 | 2 |

In turn, the server can determine the difference set between M1 and C1, where the difference set (M1-C1) includes C1 records not in M1. In some embodiments, the server only considers the fields common to both C1 & M1 (e.g., the provider and SSID fields). From the example C1 & M1 tables, the difference set is {provider=NewComm, SSID=123}. Because the traffic table (C1) includes an element not in the provisioning table (M1), the provisioning data may be inaccurate. Using the difference set, the server can insert a new record into the MI table, where the new record's fields are {provider=NewComm, SSID=123, newFlag=True, ProductionFlag=False}.

After inserting one or more new records (from the difference set) into the M1 table, the server can glean information from the records in M1. At any given time, if M1 includes a record with a ProductionFlag=False, the sever can assume one of the following may have occurred:

New SSIDs are known a priori by the provisioning system.
Never Used/Operational Upon provisioning—SSID becomes available, but flagged as never used before. Upon first successful session, this flag is cleared and dated. SSIDs still flagged after a specified time (e.g., T hours) are deemed as wrongly provisioned or unused (no traffic).
Wrongly Provisioned vs No-traffic—In table T1, T1.reject-session-count is based on RADIUS authentication records, so it can authoritatively eliminates the no-traffic sub-case, depending on its value. This leaves a wrongly provisioned NAS as the remaining sub case. Provider/NAS is uniquely determined and can therefore be authoritatively resolved.

In some embodiments, the server can use the tables noted above to determine a difference set M2-C2. For each element in the difference set, the server can insert a record in the M2 table, where each record has its ProductionFlag set equal to "True" and values for Provider, SSID, NASIp. In turn, the server can process the records in M2 to determine information about the supply chain network. At any given time, if M2 includes a record with a ProductionFlag=False, the following may be true:

New NAS—New NASs are known a priori by the provisioning system.

Never Used/Operation Upon Provisioning—Upon provisioning, NASs become available, but are flagged as never used before (i.e., ProductionFlag=False). Upon first successful session, this flag is cleared (i.e., set equal to "True") and dated. For NASs still flagged (i.e., Production Flag=False) after a selected number of days, the storage and analysis server may deem them as wrongly provisioned or unused (no traffic). A wrongly provisioned NAS has missing or incorrectly entered configuration data (e.g., incorrect IP address) or outdated provides information. This will typically cause a no traffic condition. In some instances, traffic statistics alone do not distinguish between a network/pop/venue that is broken from a network/pop/venue that is fine but unused (i.e. no traffic when venue is closed).

Wrongly Provisioned vs. No-traffic—In table T1, T1.reject-session-count is based on RADIUS authentication records, so it can authoritatively eliminate a "no-traffic" sub-case, depending on its value. That would leave a "wrongly provisioned SSID" as the remaining sub-case. At this point, the server can resolve down to the specific street address, so that it can inform the network provider or a technician about needed repair.

The table C4 provides the permutations seen so far in the authentication stream. In a perfectly managed provider network, provisioning data would include MAC Access Point (AP) table records. In some instances, MAC APs are not enumerated in the provisioning data. Thus, the cardinalities in table C4 constitute the provisioning model. We can distinguish the following sub-cases:

New Permutation no overlap—This constitutes a new permutation. Comparison of the individual data elements against the M tables we can resolve the specific circumstance: added NAS, added AP, added SSID, new AP/SSID to existing NAS, or new venue. This last sub-case can be cross-checked and flagged in the M tables to drive provisioning pending changes.

New Permutation overlap—This constitutes a situation where a new SSID/NAS association for MAC AP is detected. The old association is thus invalidated in the map mode, flagged in the provisioning model, and the new association added.

No traffic in last T hours—The server can use Table T4 to determine whether there is no usage for that permutation. If so, it can raise a down Pop/MAC flag. Otherwise it can raise a traffic degradation flag.

NAS topology changes—On well managed networks, this case is rare because of its implications on denial of service and billing. However, using table C6 would allow alerting on changes to the network topology which are not justified with a corresponding change in the provisioning model.

Cardinality Analysis

In some embodiments, the storage and analysis server can periodically perform an analysis of the following cases to address the dynamically changing nature of the supply chain network's status and topology. Here, the server examines table C5.Count of {SSID, MAC-AP, NASIp} and distinguishes the following cases:

Zero Count—This indicates that such permutation has not occurred in this period.

One Count—This indicates that such permutation has occurred exactly once in this period.

Many Count—This indicates that such permutation has occurred once or more in this period.

The server can compare the evaluations for the current period against those obtained for the prior period, where the server inspects for the following transitions:

Zero-to-One—This confirms an active/operational POP and resets flags raised during the model verification operations (see above). If the historically observed cardinality for this provider has been one, then address resolution is enabled at the POP level. Otherwise, maximum resolution is at the Location level. However, if after a period of time the historical cardinality does not rise from one to N as expected from the current history, then the model is updated with a new historical cardinality of one. Thus, enabling address resolution at the POP level from that point forward. The selection of the relevant POP can be determined by eliminating the rest of the permutations associated for that provider/SSID/NASIP not matching the permutation observed.

One-to-Two—An N cardinality is confirmed only when at least two permutations are observed within the same time period. Observing two permutations on different time periods only increases the confidence level that the cardinality is in fact N, but is not until they occur on the same interval that the confidence goes to 100%. N cardinality is confirmed and address resolution is only available at Location level.

Two-to-N.—No change in address resolution. If implied by the model then model is confirmed otherwise a model change flag is set for the provider/permutation.

N-to-Two—No change in address resolution, but permutation is flagged as potential provisioning model change.

Two-to-One—Provider/permutation model is flagged as an observed model change and left unconfirmed until a suitable confirmation condition is met (x number of periods in a row where same permutation is the only one observed excluding intervals with zero instances).

One-to-Zero—Zero intervals are excluded from confirming the N-to-1 cardinality provisioning model change explained above because a zero permutation might be due to a non-visited or non-operational POP. Model verification algorithm earlier discriminates these two cases and flags the POP/permutation accordingly. If the current model in-force was 1-cardinality then address resolution is still enabled at the POP level, but with an indication of the closed/down status. On the other hand, if the model in force was N-cardinality then address resolution is still allowed only at the Location level.

Zero-to-Zero—This condition provides support for discriminating "closed" versus "down" permutation/POPs. After N intervals of zero successful logins with positive reject counts, then a down condition is confirmed. If the number of attempts is also zero, the closed status is confirmed with higher confidence.

POP Level Resolution

In some embodiments, the storage and analysis server can perform POP level resolution for N-cardinalities. The server can perform this analysis for specific provider networks in various ways including:

Provisioning of MAC AP addresses

Provisioning information based on knowledge of media access type or network topology.

GPS {lat/long} collected by the connection agent and later correlated using a triangulation/interpolation process to narrow the list of possible pop/permutations down to a single permutation.

Third party location discovery databases/services that essentially allows us to join our MAC address table to a table containing MAC Address and venue's Street address.

Real-Time Processing

In some embodiments, the storage and analysis server can perform real-time processing. In some instances, the RADIUS accounting and authorization records are produced and stored on a real-time basis. The server can evaluate the CDRs and other tables incrementally and compare either against its cumulative state using a rolling window or against interval based summaries for more efficient computation.

Quality/Confidence Determination

In some embodiments, the storage and analysis server can determine quality/confidence information. This information can be expressed in terms of probabilities (0-100%) that are adjusted based on time-period reinforcement and number of disambiguated cases. These situations were noted above, but are summarized below:

AP Down/Closed determination. When zero permutations are found in CDRs then we are only 50% certain on this state determination. Once traffic is confirmed (connection attempts/rejects) we can raise the certainty to 100% to one or the other.

SSID down/closed determination. Like the prior but at the SSID level. Network topology plays a role because if there is only one AP for that SSID then their state/certainty match. If multiple AP are available for that SSID then SSID can be further evaluated in terms of known AP working 3 out 4 indicates 75% operational.

Model change based on cardinality transitions

One-to-One or Zero-to-One confirms 100% a one-cardinality model, if so provisioned.
Otherwise certainty raises/lowers 1/N with the number of 1-permutations seen over the past N periods.
Other probability weighting models are possible.

One-to-Two raises the confidence level to 100% for N-cardinality, and flags the model as invalid if currently known with One-cardinality. Model can automatically be adjusted.

Two-to-One confidence increases confidence on one-cardinality model of 1/N based on last N intervals if only that same permutation is seen. Zero permutations are ignored because they do not contribute to model determination.

Two-to-Two confidence increases for N-cardinality model at a rate of 1/N over the last N periods. It is evident that confidence for 1 and N cardinality is tracked independently.

2-to-N and N-to-N reinforces the confidence of the n-cardinality model at 100%.

Network Performance Analysis

Once the MAC-AP table is produced, the network can be end-to-end monitored at the finest level of granularity (i.e., at the POP level). Performance data is often attached to all the data records described earlier including: RADIUS authentication and accounting records, CDRs, connection agent records, and IP Frame records and can therefore be linked to a specific permutation in the MAC-AP table. Only one permutation need occur for that MAC-AP entry to be created for the MAC-AP record to be available. The earliest point where this can be determined depends on the access technology. For example on a Wi-Fi network, a connection agent must be able to associate to the access point to known the access point's MAC address. Upon making the association, the MAC-AP will be available in connection agent data. Performance analysis is also something that can be interval or real-time based. They both may require maintaining a time-bucket based history of performance data for each of the relevant model entities namely: provider, pop, location, nas, mac AP, SSID, and the following list of metrics:

number of attempts
number of total sessions, auto-connect sessions, manual sessions.
number of auth rejects
number of auth accepts
session time
In-packets
Out-packets In some instances, the following dimensions may also be needed: 1) Client demographics {platform, version, customer} 2) Location demographics {country, state, venue type, city . . . } 3) Model {provider, SSID, location}. Also, the following status determinations may be needed: UP, Down, Closed, Impacted (operational but at below average performance), Overloaded (Operational at above average performance), uptime and downtime.

What is claimed is:

1. A method for correlating supply chain network information received from supply chain network components controlled by different entities, the method comprising:
receiving connection agent information indicating access point identifiers associated with network access points;
receiving provisioning information including physical location identifiers identifying venues at which the network access points reside;
receiving network authorization request and response records, wherein the network authorization request and response records include data associated with the connection agent information and the provisioning data;
determining an association between one of the physical location identifiers that identifies one of the venues and one of the access point identifiers associated with one of the network access points, the determining including,
selecting, based on the common data, the physical location identifier from the provisioning information; and
selecting, based on the common data, the one of the access point identifiers from the connection agent information.

2. The method of claim 1, wherein the access point identifiers include one or more of media access control addresses, phone numbers, access point names, municipal Wi-Fi identifiers, and service set identifiers.

3. The method of claim 1, wherein the common data includes session identifiers associated with one of the different entities.

4. The method of claim 1, wherein the connection agent data originates at one or more connection agents configured to communicate with the network access points.

5. The method of claim 1, wherein the provisioning data originates at the different entities.

6. The method of claim 1, wherein the network authorization request and response records originate from a service provider.

7. The method of claim 1, wherein the network authorization request and response records include data defined in one or more of Remote Authentication Dial In User Service (RADIUS) protocol, Diameter protocol, total access communication system (TACS) protocol, SOAP protocol, and Directory Services x.500 protocol.

8. A method comprising:
compiling information about a supply chain network, the information including,
connection agent data created by connection agents configured to connect to access points and exchange information over the supply chain network;
Authentication Authorization and Account (AAA) data created by an internet service provider's component in the supply chain network; and
provisioning data describing attributes of the internet service provider's component and other components of the supply chain network;
determining physical location identifiers associated with the access points, the determining based on the connection agent data, the AAA data, and the provisioning data;
determining, based on the connection agent data, that one of the access points is exhibiting unsatisfactory performance;
transmitting a service request identifying the access point exhibiting irregular performance, wherein the service request includes one of the physical location identifiers associated access point.

9. The method of claim 8, wherein the physical location identifier includes one or more of a street address, telephone number, map coordinates, and reference to database including additional location information.

10. The method of claim 8 further comprising:
inspecting AAA start records in the AAA data to corroborate the determination that the access point is exhibiting irregular performance.

11. The method of claim 8, wherein the determining physical location identifiers associated with the access points includes matching Media Access Control Addresses of the access points to the physical location identifiers.

12. The method of claim 8, wherein the AAA data is formatted according to one or more of Remote Authentication Dial In User Service (RADIUS) protocol, Diameter protocol, total access communication system (TACS) protocol, SOAP protocol, and Directory Services x.500 protocol.

13. A method for using traffic data to verify provisioning data in a supply chain network, the method comprising:
receiving provisioning data identifying components of the supply chain network, the provisioning data including a first group of access point Media Access Control (MAC) addresses associated with the supply chain network and a first group of network access server (NAS) Internet Protocol (IP) addresses associated with the supply chain network;
linking RADIUS accounting start and stop records with RADIUS authentication records to form Call Detail Records (CDRs), wherein the CDRs identify a second group of NAS IP addresses associated with the supply chain network;
linking the CDRs to connection agent data to form the traffic data, wherein the connection agent data indentifies a second group of access point MAC addresses associated with the supply chain network;
determining, by comparing the traffic data to provisioning data, one or more of the following,
the first group of access point MAC addresses does not match the second group of access point MAC addresses, and
the first group of NAS IP addresses does not match the second group of NAS IP addresses.

14. The method of claim 13 further comprising:
adding certain access point MAC addresses from the second group to the first group of access point MAC addresses.

15. The method of claim 13 further comprising:
adding certain NAS IP addresses from the second group to the first group of NAS IP addresses.

16. The method of claim 13 further comprising:
transmitting one or more notifications indicating that the provisioning data does not match the traffic data.

17. The method of claim 13 further comprising:
transmitting one or more notifications indicating that a NAS needs service, wherein the NAS is associated with one of the first group's NAS IP addresses.

18. The method of claim 13 further comprising:
transmitting one or more notifications indicating that an access point needs service,
wherein the access point is associated with one of the first group's access point MAC addresses.

19. A system comprising:
a connection agent configured to transmit a network connection request including a unique session identifier, connect to an access point on a supply chain network, and transmit connection agent data including a Media Access Control (MAC) address associated with the access point and the unique session identifier;
a transaction server configured to transmit the connection request through the supply chain network;
a storage and analysis server including provisioning data identifying a physical location of the access point, wherein the storage and analysis sever is configured to receive the connection request and the Media Access Control address, and wherein the storage and analysis server is configured to link, based on the unique identifier and MAC address, the physical location to the access point.

20. The system of claim 19, wherein the physical location identifier includes one or more of a street address and map coordinates.

21. The system of claim 19, wherein the network connection request is in RADIUS format.

22. The system of claim 19, wherein the storage and analysis server is further configured to transmit notices including the physical location and the access point.

23. A method for predicting malfunctions in a supply chain network, the method comprising:
receiving a first set of connection agent data including information about a first group of successful and unsuccessful connections to a network;
receiving a first set of Authentication Authorization and Account (AAA) data including authentication records, connection start, and connection stop records associated with the first group of successful and unsuccessful connections to the network;
determining, based on the first sets of connection agent data and AAA data, a first performance metric about the network;
receiving a second set of connection agent data including information about a second group of successful and unsuccessful connections to the network;
receiving a second set of AAA data including authentication records, connection start, and connection stop records associated with the second group of successful and unsuccessful connections to the network;

determining, based on the second sets of connection agent data and AAA data, a second performance metric about the network; and determining, based on a comparison between the first and second performance metrics, that one or more components of the network are malfunctioning.

24. The method of claim 23 further comprising:

associating the first set of connection agent data to the first set of AAA data, the associating based on one or more of timestamps, access point identifiers, and network access server (NAS) Internet Protocol (IP) addresses.

25. The method of claim 23, wherein the first and second performance metrics indicate one or more of a number of successful connections to the network over a time period, a number of connection attempts to the network over a time period, and traffic through the one or more components of the network over a time period.

26. The method of claim 23, wherein the connection services facilitate connectivity to a network using one or more of access points and telephone connections.

* * * * *